June 2, 1925.
D. REINMILLER
PAN HANDLING TOOL
Filed Jan. 31, 1925
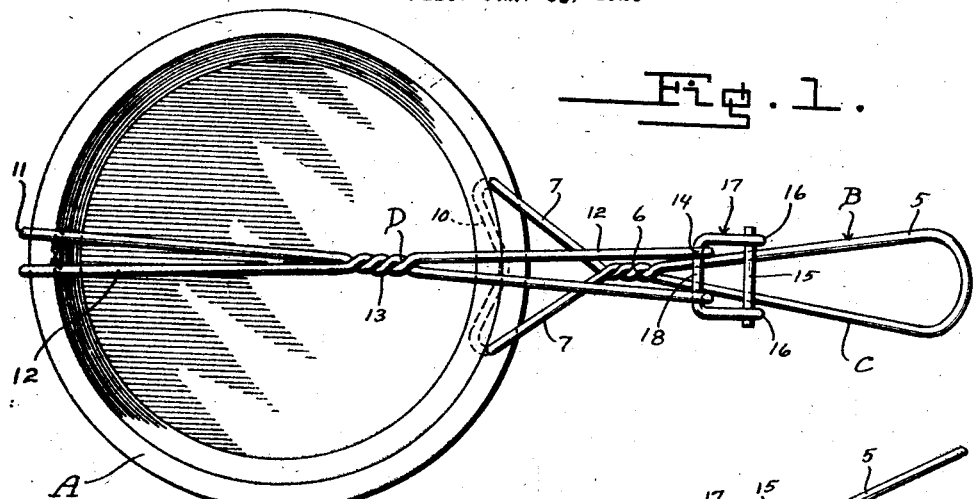
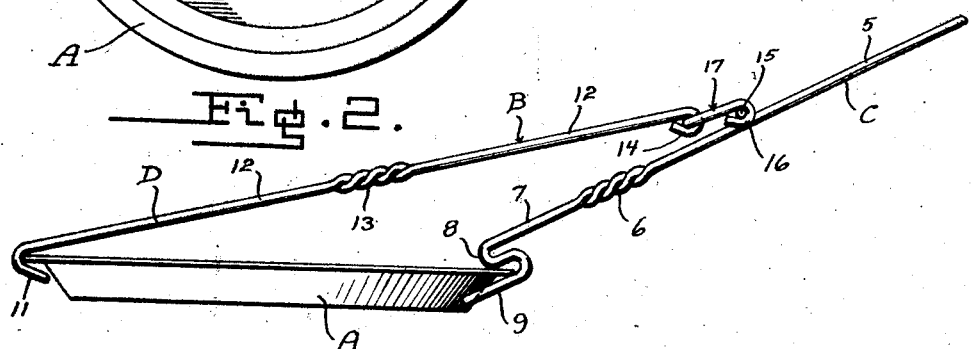
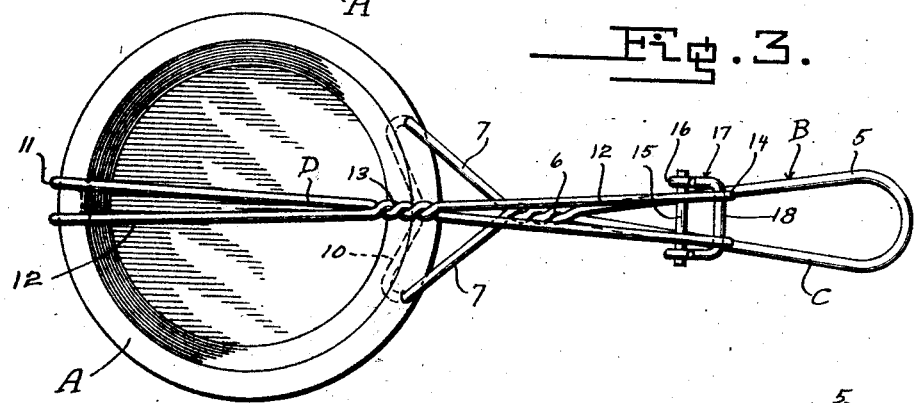
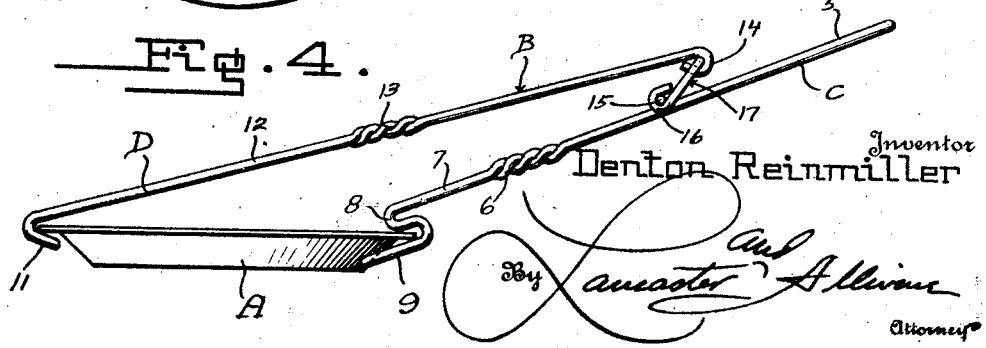
Inventor
Denton Reinmiller Patented June 2, 1925.

1,540,184

UNITED STATES PATENT OFFICE.

DENTON REINMILLER, OF RACINE, WISCONSIN.

PAN-HANDLING TOOL.

Application filed January 31, 1925. Serial No. 5,965.

*To all whom it may concern:*

Be it known that I, DENTON REINMILLER, a citizen of the United States, residing at Racine, in the county of Racine and State of Wisconsin, have invented certain new and useful Improvements in a Pan-Handling Tool, of which the following is a specification.

The present invention relates to pan handling tools particularly well adapted for use in removing hot pans or dishes from ovens.

The primary object of the invention being to provide a device of this character which is extremely simple in construction, and embodying novel features whereby pans of various sizes may be readily grasped by the tool.

A further object of the invention is to provide an improved pan handling tool which is of such construction as to permit of the removal of hot pies or cakes from ovens, without liability of the tool coming into contact with the contents of the pans.

A still further object of the invention is to provide an improved device of this character embodying two major portions which may be formed entirely of wire of a suitable gauge, and with the portions so connected as to permit of the handle portion of the device being disposed well above the surface upon which the pan is resting, thereby eliminating possible burning of one's hand when applying or removing the tool from the pan.

Other objects and advantages of the invention will be apparent during the course of the following detailed description, taken in connection with the accompanying drawing, forming a part of this specification, and in which drawing, Figure 1 is a top plan view of the tool or device, shown applied to a pan of a relatively large size.

Figure 2 is a side elevation of the showing in Figure 1.

Figure 3 is a top plan view of the tool, and showing the manner in which the tool may be applied to a smaller pan than that illustrated in Figures 1 and 2; and Figure 4 is a side elevation of the showing in Figure 3.

Referring to the drawing in detail, and wherein similar reference characters designate corresponding parts throughout the several views; the letter A may generally designate a pan or other utensil of any desired form, and B the improved handling tool therefor; said tool embodying a handle portion C, having hingedly connected thereto at a point substantially midway the length thereof, a spanner arm portion D adapted for swinging movement in a vertical plane with the handle portion C.

Referring more particularly to the handle portion C, the same may be formed from a single piece of wire bent into U-shape intermediate its ends for forming a handle or hand-grip 5, and having its arms converging inwardly and twisted about one another as at 6. Extending in diverging relation from the forward end of the twisted portion 6, and lying in a plane with the handle 5, are arms 7, each of which is formed at its forward end with depending S-shaped rim or flange engaging hooks 8 having their lower portions 9 extending beyond the forward terminals of the arms 7 for engaging the outer wall of a pan to be handled, and then directed toward one another as at 10, with their abutting ends secured together in any suitable manner as by soldering or welding. It is preferred that the portion 10 be arcuated rearwardly intermediate its ends, so as to permit of the same conforming to the wall of a round pan. Extending the portions 9 beyond the forward ends of the arms 7, permits of a sufficient grip being had beneath the rim of the pan when the handle portion C is disposed at various angles.

Referring now to the spanner arm D, the same may also be formed of a single piece of wire bent substantially upon itself centrally of its ends, with its U-shaped forward end bent downwardly and rearwardly for forming a hook 11 at the forward end of the spanner arm. The arms 12 of the spanner, which are twisted upon one another intermediate their ends as at 13, extend rearwardly from the twisted portion 13 in slightly diverging relation, and have their rear ends formed into eyes 14 disposed in spaced apart parallel relation one to the other.

Secured to the upper face of the handle 5 as by welding or other suitable means, and at a point intermediate the twisted portion 6 and rear end of the handle, is a transversely disposed hinge pin 15 having its ends projecting outwardly past the arms of the handle as clearly illustrated in Figures 1 and 3. These projecting ends of the pin 15 are adapted to receive eyes 16 of a bail 17, and which bail is intended for free swinging movement upon the pin. This bail is formed with a cross arm 18 to which the spaced apart eyes 14 formed at the rear end of the spanner arm D are attached, and which cross arm is adapted for swinging movement in an arcuate manner in parallel relation with the hinge pin 15. It will here be seen, that the bail 17 forms a double hinge arrangement whereby upon swinging movement of the bail, the hook portions 8 and 11 formed on the handle portion C and spanner arm portion D respectively, will be moved toward and away from one another for permitting of the grasping of pans of various sizes. Pivotally connecting the rear end of the spanner arm D to the handle portion C at a point well remote from the pan engaging hooks 8 of the handle portion, provides a structure whereby the spanner arm is held in a position well above the contents of the pan.

In use, the hook 11 may first be applied to the rim of a pan with the spanner arm D extending upwardly at quite an angle; the handle portion C may then be moved for bringing the hooks 8 into operative relation beneath the rim at the opposite side of the pan from the hook 11, and then by moving the rear end of the handle portion downwardly, the device will firmly grip the pan in a manner as illustrated in Figures 1 and 2. When intended for use upon smaller pans than that illustrated in Figures 1 and 2, the bail 17 may be swung rearwardly about the pin 15, thus shortening the distance between the hooks 8 and 11, and thus adapting the device to smaller pans as illustrated in Figures 3 and 4. Should it become desirable to further elevate the spanner arm above the contents of a pan of the size illustrated in Figures 1 and 3, the bail may be swung to a position as illustrated in Figure 4, thus increasing the angle of the spanner arm with respect to the pan, and yet permitting of a sufficient grip being had on the pan due to the elongated portions 9 of the hooks 8.

From the foregoing description of this invention it will be apparent that an extremely efficient pan handling tool has been provided whereby pans of various sizes may be readily transported without liability of the device coming into contact with the contents of the pan, and embodying features of construction whereby the hand gripping portion of the device is disposed well above the surface upon which the pan is resting, thereby eliminating possible burning of the hand of the operator by coming into contact with the surface should the surface be hot.

Changes in detail may be made to the form of the invention herein shown and described, without departing from the spirit of the invention or the scope of the following claims.

I claim:

1. A pan handling tool comprising, a handle portion formed of a single piece of wire bent substantially upon itself intermediate its ends for forming a handhold, and having its opposite end formed into S-shaped rim engaging hooks; a spanner arm formed of a single piece of wire bent substantially upon itself intermediate its ends, having a hook formed at one end thereof, and spaced apart eyes formed at its opposite end; a hinge disposed transversely of the handle portion at a point substantially midway thereof; and a bail pivotally mounted on said hinge pin and having a cross arm for receiving the eyes of said spanner arm.

2. A pan handling tool comprising a handle portion having rim engaging hooks formed at its forward end; a spanner arm portion having a rim engaging hook formed at its forward terminal, and spaced apart eyes formed at its rear end; a hinge pin carried by said handle portion and extending transversely thereof; and a bail having eyes pivotally mounted on said hinge pin, and having a cross arm extending through the eyes of said spanner arm, said cross arm being adapted for swinging movement in arcuate parallel relation with the hinge pin for permitting of relative adjustment of the hook portions.

DENTON REINMILLER.